United States Patent [19]

Gebhardt

[11] 4,231,831
[45] Nov. 4, 1980

[54] APPARATUS AND METHOD FOR FORMING AN ELONGATED STRUCTURAL ELEMENT FROM PLASTIC MATERIAL AND FOR APPLYING A DECORATIVE FILM THERETO

[75] Inventor: James L. Gebhardt, Roswell, Ga.

[73] Assignee: The Mead Corporation, Dayton, Ohio

[21] Appl. No.: 34,365

[22] Filed: Apr. 30, 1979

Related U.S. Application Data

[63] Continuation of Ser. No. 861,547, Dec. 19, 1977, abandoned.

[51] Int. Cl.³ .................... B44C 1/14; B44C 1/24; B44C 3/02
[52] U.S. Cl. .................... 156/233; 29/121.1; 156/234; 156/235; 156/238; 156/239; 156/240; 427/211; 428/458; 428/914
[58] Field of Search ............ 156/230, 231, 233–235, 156/238, 239, 240, 244.16; 264/132 R, 177 R; 427/209–211, 428; 428/458, 462, 913, 914; 29/121.1

[56] References Cited
U.S. PATENT DOCUMENTS

| | | | |
|---|---|---|---|
| 2,862,837 | 12/1958 | Brennan | 427/209 |
| 3,010,861 | 11/1961 | Reese | 156/238 X |
| 3,620,872 | 12/1971 | Backwell | 264/132 |
| 4,062,918 | 12/1977 | Nakanose | 427/209 |

Primary Examiner—Bruce H. Hess
Attorney, Agent, or Firm—Walter M. Rodgers; Walter A. Rodgers

[57] ABSTRACT

Polystyrene pellets are continuously supplied to extrusion means which continuously forms an elongated element whose form and shape is stabilized by hydraulic cooling means through which the element is moved, following which the element is dried and heated and then supplied between heated pressure rolls along with a tape on one surface of which a coating has been applied and which includes a decorative film, the coating being in face contacting relation with a surface of the elongated element, the temperature of the pressure rolls and the velocity of the movement of the tape and elongated element therebetween being correlated in such manner as to cause a decorative film to be removed from the tape and deposited on the elongated element, following which the element and tape are engaged and transported away from the pressure rolls into a cutting station at which the element is severed into desired lengths. If desired a second set of pressure rolls may be disposed downstream from the first pair of pressure rolls and may be utilized to apply a decorative film to another surface of the elongated element which is angularly related with the first surface, the elongated element being twisted so as to accommodate this operation with the second set of pressure rolls which are oriented similarly to the first pair of pressure rolls.

4 Claims, 12 Drawing Figures

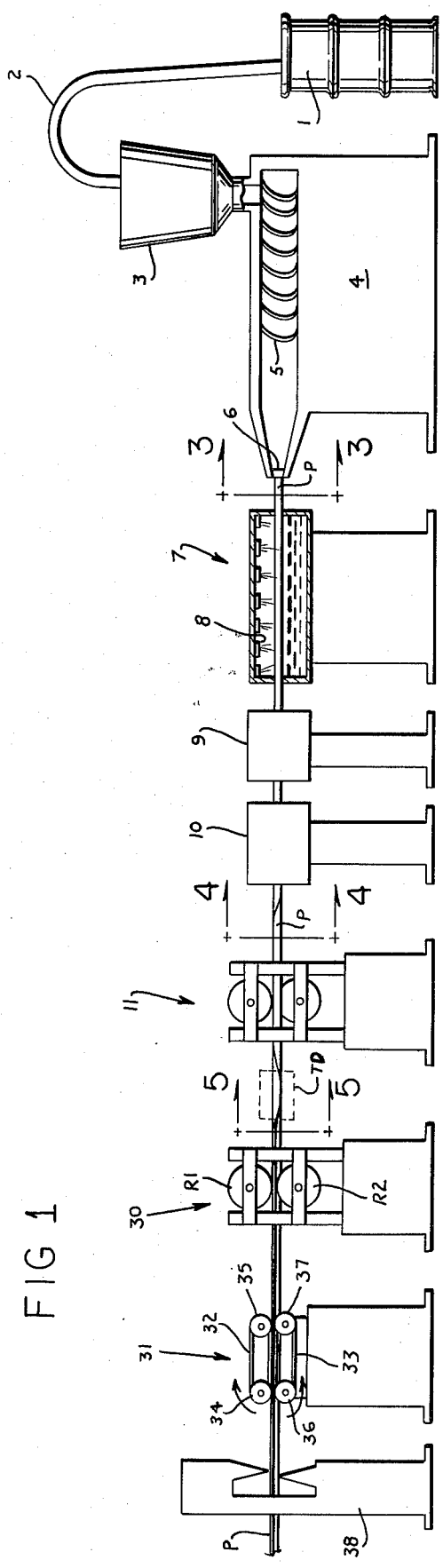
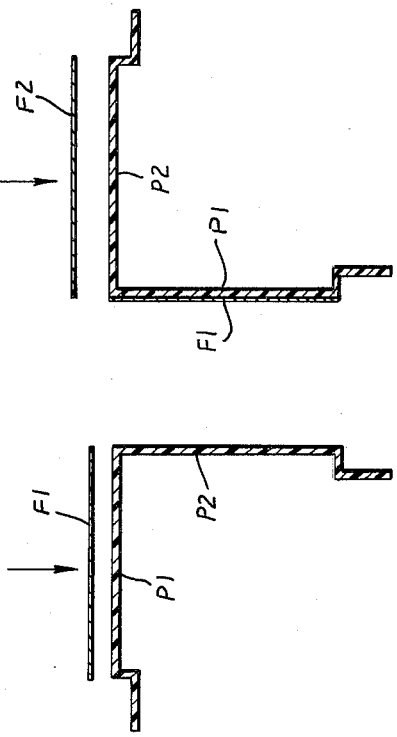
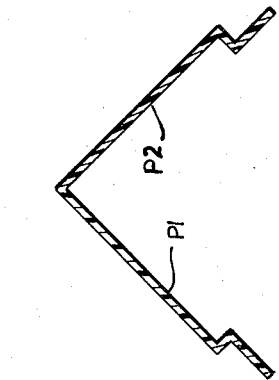
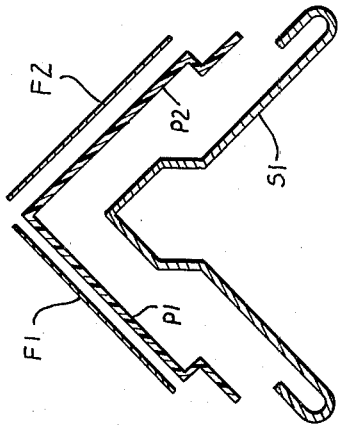

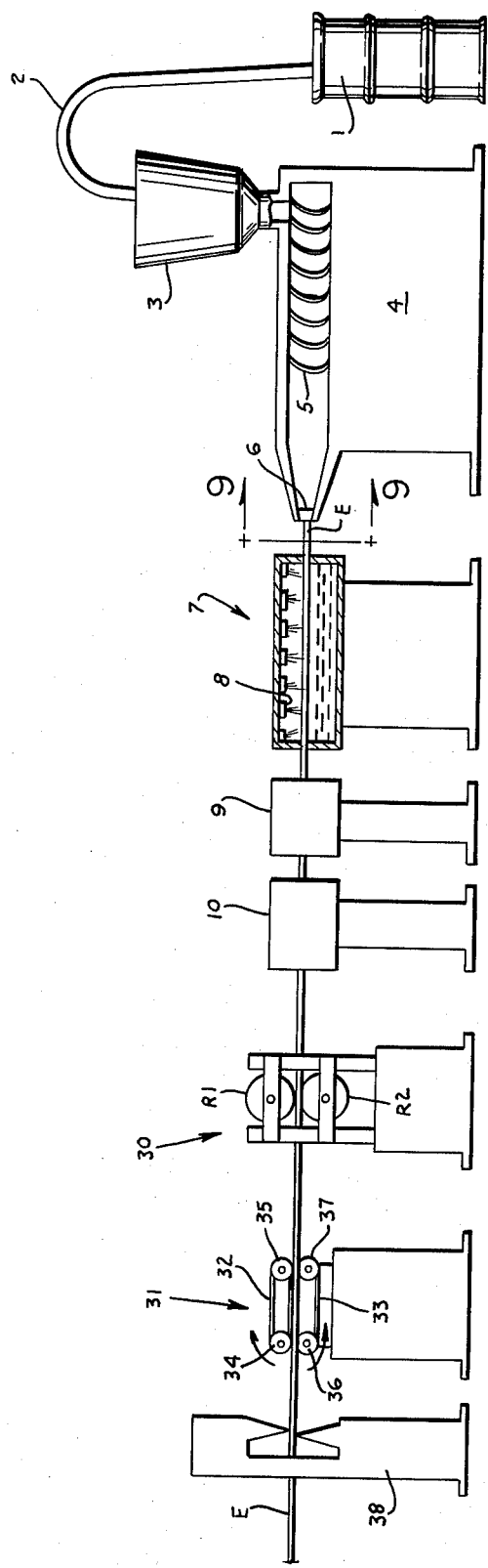
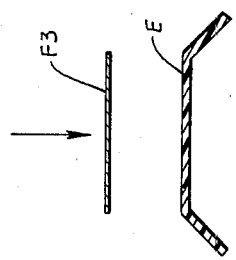
FIG 9
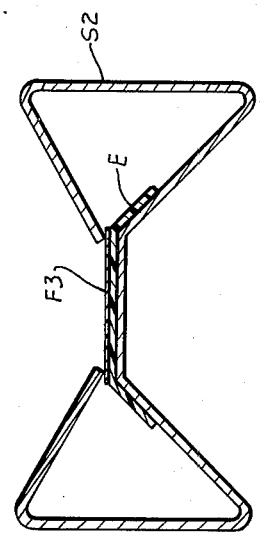
FIG 8
FIG 7

APPARATUS AND METHOD FOR FORMING AN ELONGATED STRUCTURAL ELEMENT FROM PLASTIC MATERIAL AND FOR APPLYING A DECORATIVE FILM THERETO

This is a continuation, of application Ser. No. 861,547 filed Dec. 19, 1977, now abandoned.

Structural elements such as the upright structural post of display stands may be formed according to U.S. patent application Ser. No. 685,519 filed May 12, 1976 which is now abandoned and refiled as continuation applications Ser. No. 852,945 filed Nov. 18, 1977 and Ser. No. 865,592 filed Dec. 29, 1977 and divisional application Ser. No. 851,447 filed Nov. 14, 1977 which are assigned to the assignee of this invention. Such structural posts are configured in such manner as readily to receive support clips which in turn cooperate with and afford support for shelves. The cross sectional configuration of such support posts may vary but in certain instances the configuration is such as to require the application of an exterior decorative sheath thereto. If such sheaths are constructed of sheet metal their cost becomes prohibitive and in addition such elements in some instances incorporate exposed edges which pose a hazard to small children. Also it is desirable to treat the surface of such sheath elements in a manner to render them decorative and pleasing in appearance. Formation of such structural sheaths from metal with suitable decorative coatings applied thereto necessitates a multistage manufacturing operation which is of prohibitive cost.

According to this invention, elongated elements for use in conjunction with the posts of display stands and for other purposes may be formed by extruding the structural elements from plastic pellets on a continuous basis, each extruded elongated element being cooled through hydraulic cooling means, dried and reheated to a suitable temperature for insertion between a pair of pressure rolls along with a polyester tape having a coating disposed in face contacting relation with a surface of the extruded elongated element to which a decorative film is to be applied, the temperature of the pressure rolls and the velocity of movement of the elongated element and tape between the rolls being controlled in such manner that a change in temperature of the rolls of approximately 8.75° Fahrenheit is correlated with a change in linear velocity of the elongated element and the associated tape of approximately one foot per minute, following which friction means engages the elongated element to which decorative film has been applied and facilitates removal thereof linearly from the pressure rolls to a cutting station at which the elongated element with its decorative film is cut into desired lengths.

For a better understanding of the invention reference may be had to the following detailed description taken in conjunction with the accompanying drawings in which FIG. 1 is a schematic view of an overall system formed according to the invention;

FIG. 2 is a cross sectional view of the elongated element formed according to the invention shown in conjunction with another structural element which together may form a support post for a display stand;

FIG. 3 is a cross sectional view taken along the line designated 3—3 in FIG. 1 and which shows the orientation of the extruded elongated element as it leaves the extrusion apparatus;

FIG. 4 is a cross sectional view of the elongated element and schematically represented film tape as it appears approximately along the line 4—4 in FIG. 1;

FIG. 5 is a view taken approximately along the line designated 5—5 and which shows the elongated element in another position to which it is twisted in order to permit application of decorative film to another surface of the elongated element;

FIG. 7 is a view similar to FIG. 1 but which incorporates only one set of pressure rolls;

FIG. 8 is a cross sectional view of a post which includes a elongated element which has only one surface to which a decorative film is to be applied according to one aspect of this invention;

FIG. 9 is a view taken generally at the position designated 9—9 in FIG. 7 and in which

Figure 6A:
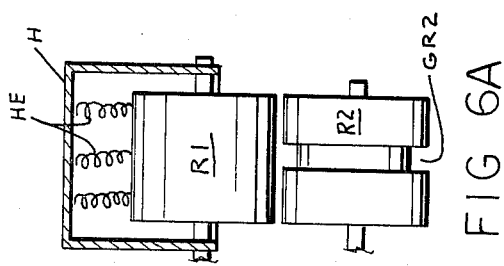
FIGS. 6A and 6B are fragmentary views of a part of the structure of FIG. 6 and which show the heated pressure rolls from two vantage points.

With reference to FIG. 1, a storage reservoir designated by the numeral 1 contains high impact polystyrene pellets which are continuously withdrawn from reservoir 1 through conduit 2 by suitable vacuum means into the funnel-like receive structure 3 from which the pellets are supplied continuously to the extrusion apparatus generally designated by the numeral 4. Extrusion apparatus 4 is of conventional construction and includes an auger schematically represented at 5 together with a die schematically represented at 6. The structure extruded through the die 6 is shown in FIGS. 2-5 and is represented by the letter P, the temperature of which is in the range between 400° and 425° F. as it leaves die 6.

The plastic pellets supplied from reservoir 1 may take several suitable forms but preferably are of the polystyrene type made and sold by the Foster Grant Company and designated Tuf-Flex formula 730D.

Since the extrusion P is soft and not well stabilized as it leaves the die 6, it must be quickly cooled in order to stabilize its shape and form. Such cooling is effected by conventional cooling apparatus generally designated by the numeral 7 which includes a plurality of water jets designated by the numeral 8 which spray cooling water continuously on the elongated element P as this element moves continuously through the cooling element 7.

Of course the cooling water in cooling element 7 wets the surfaces of the elongated element P and this water must be removed. Such removal is effected by dryers schematically represented by the numeral 9 and which may include air circulating devices. Following drying, the elongated element is passed through heating means 10 which comprise a plurality of infrared radiating devices, electric heating coils, or the like. This heating operation conditions the elongated element P for application to the heated pressure rolls designated generally by the numeral 11.

Figure 6B:
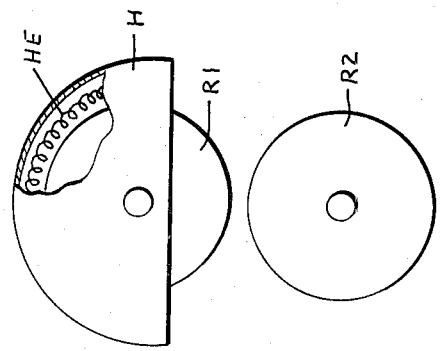
Figure 6:
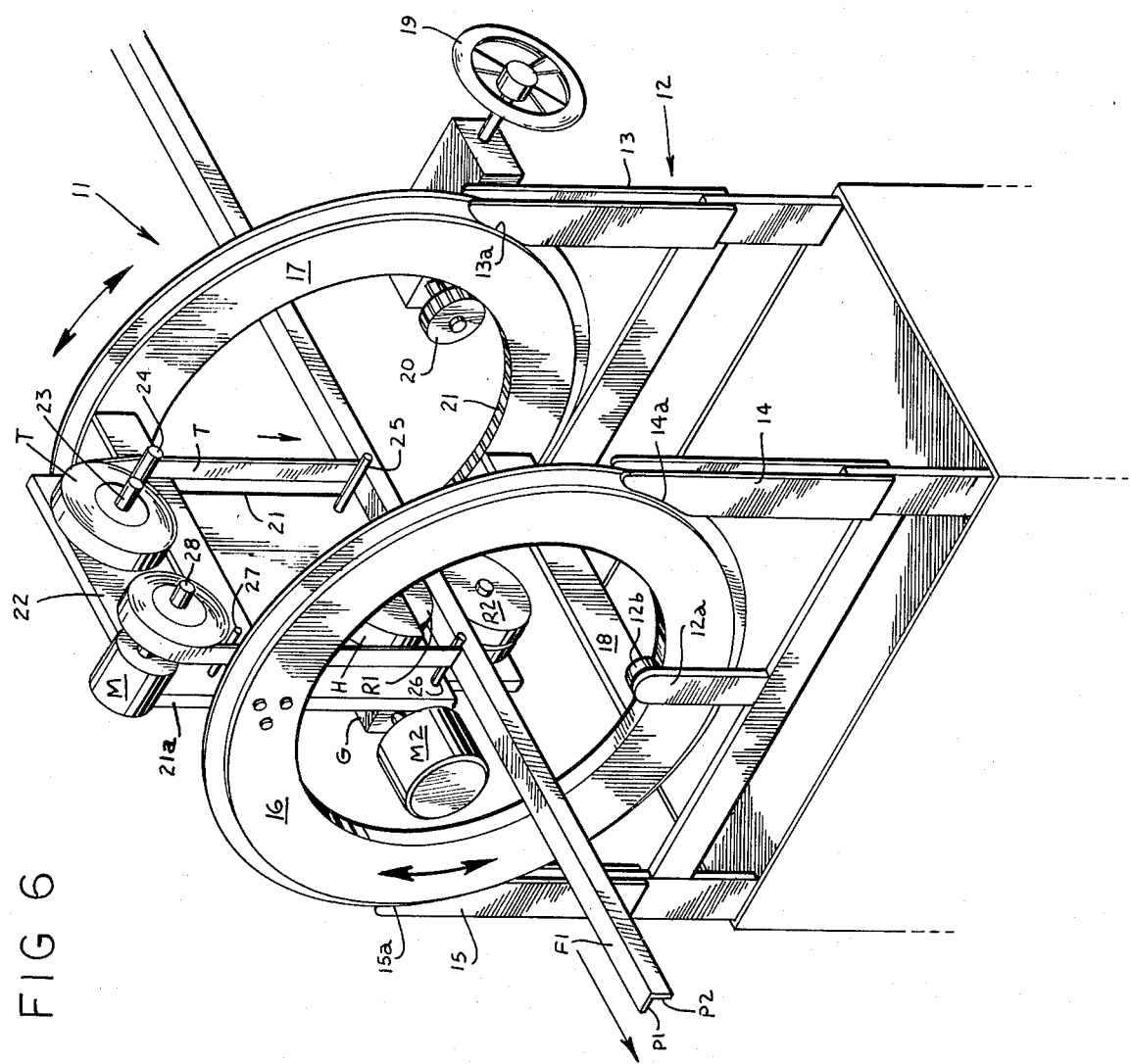
FIG. 6 is a perspective view of pressure forming structure utilized according to the invention.

In FIG. 6 the heated pressure rolls generally designated by the numeral 11 are shown in detail. As shown in FIG. 6 a frame generally designated by the numeral 12 includes corner uprights 13, 14, 15 and another corner upright not observable in FIG. 6. These upright elements are provided with arcuate curved surfaces 13a, 14a, and 15a. Of course a similar arcuate surface is provided on the fourth upright element which is not observable in FIG. 6. Cooperating with arcuate structures 14a and 15a is a ring-like structure 16 which is rotatable and which is interconnected with a similar ring-like structure 17 by a cross bar 18. Standard 12a is provided with a roller 12b which rides on the inner surface of ring 16 and imparts stability thereto.

For imparting rotary motion to rings 16 and 17 and cross bar 18 a manually operable crank 19 is mounted on support 13 and arranged by suitable gearing to rotate the pinion 20 whose teeth cooperate with teeth 21 formed on the inner periphery of ring 17. Thus rotation of crank 19 imparts rotary motion to both of the rings 16, 17 and the support bar 18.

For the purpose of mounting pressure rolls on the ring structure 16, 17, and 18, mounting brackets 21 and 21a together with cross head 22 are suitably supported by the rings 16 and 17 and a pin 23 is mounted on cross head 22 and forms a support for the tape roll designated T. The tape T is fed around posts 24 and 25 between the pressure rolls R1, R2 around guide pins 26 and 27 and onto shaft 28 of motor M. Thus as elongated element P passes between rolls R1 and R2 tape T is pressed in face contacting relation with the upper surface of flange P1.

Tape T preferably is formed of polyester material of approximately ⅛ Mil thickness. To one surface of tape T a coating is applied which includes a thin release coat on top of which a protective lacquer of 0.05 to 0.06 Mil in thickness is applied on top of which a metallizing film of 0.009 to 0.020 Mil is deposited. On top of the metallizing film a sizing or adhesive coat is applied and the total thickness of this coating for most purposes is in the range of 0.06 to 0.12 Mil. The release coat functions to release the other layers from the polyester film upon the application of heat and the sizing coat functions to cause the metallizing layer to adhere to a surface to be coated with metallized film. Preferably the metallized film is formed of aluminum. If the protective layer is clear then the aluminum film will appear as a silver foil whereas if a transparent amber lacquer is used a gold color results. Of course other decorative treatments may be employed according to known procedures. Different colors or wood grain decorative coatings may be substituted for the metallizing aluminum film.

The film C is oriented and fed through the rolls R1 and R2 so that the coating is in face contact with the upper surface of flange P1 of the elongated plastic element P which is to be coated.

In order to impart driving rotation to roll R1 which preferably is constructed of rubber, a motor M2 is employed and is coupled by gear box G with the shaft of roll R1.

From FIG. 6A it is apparent that roll R2 is provided with a groove GR2 which receives the flange P2 of elongated plastic element P during the application of metallized film to flange P1 of elongated element P.

Not only must the speed of rubber roll R1 and in turn the speed of rotation of idler roll R2 be controlled by controlling motor M2 by known means, the temperature of the rolls must also be regulated. As is shown in FIG. 6B the roll R1 is partially covered by a hood H. Inside of hood H a heater element HE is disposed and may comprise electric heater units the temperature of which may be adjusted by known means. Generally speaking and within limits the higher the temperature of the pressure rolls and the higher the temperature of elongated element P as it enters the pressure rolls the greater the velocity and resulting production efficiency of elongated element P can be.

Once the tape T passes between the rolls R1 and R2 and deposits a film along flange P1, the polyester base portion of the tape is wound on shaft 28 of motor M the speed of which is adjustable. Preferably this motor is of the low torque type so that it will not rupture the tape T during a winding operation even though the increasing diameter of the roll effects variations in torque required.

For practical purposes, structure such as elongated element P and its associated tape can be operated at an optimum roll temperature of 600° F. and at a linear speed of approximately 17 feet per minute. A minimum roll temperature has been found to be 550° F. at a linear speed of 14 feet per minute and a maximum feasible temperature has been found to be 650° F. at a velocity of 19 feet per minute. The optimum temperature and linear velocity representing the structure shown in FIGS. 2–6 is plotted on FIG. 10 and designated at the point Z1.

In order to apply a decorative film to the flange P2 of the elongated plastic element P, and in accordance with one facet of this invention, a second set of pressure rolls may be employed as shown in FIG. 1 and as designated generally by the numeral 30. These rolls, if desired, may take the form generally represented in FIG. 6 although it is not absolutely necessary that both rolls 11 and 30 be rotatably mounted on rings such as 16, 17 and support bar 18 as shown in FIG. 6 and as described above because the elongated element P may be twisted sufficiently to cause the flange P1 to ride in the groove GR2 formed in the lower roll R2 of the pressure rolls 30. It is obvious that this reorientation of the plastic element P while maintaining similar orientation of the pressure rolls 11 and 30 conditions flange P2 for the application of a metallic film thereto as described above in connection with pressure rolls 11 and flange P1 since the angle of twist corresponds to the angle between flanges P1 and P2 as is apparent from FIGS. 4 and 5 which show that the flange P2 is normal to flange P1 and that due to the twisting operation, flange P2 is reoriented from a vertical disposition to a horizontal disposition while flange P1 is reoriented from a horizontal to a vertical disposition due to counterclockwise twisting of element P. Preferably static plow means sometimes called a twister die TD is mounted between rolls 11 and 30 and is arranged to engage element P to aid in twisting that element before entry between rolls 30. The die TD is shown schematically in dotted lines to show the twist in element P.

After the decorative film is applied to both flanges of the elongated element P, it must be transported from the rolls 30. This action is accomplished by movable means generally designated at 31 which may include a pair of endless friction elements of rubber belts 32 and 33 which are rotatably mounted respectively on rolls 34, 35, 36, and 37. Of course one roll of each pair such as 34 and 36 are driven in such manner as to impart rotary movement thereto in a direction which tends to cause the elongated plastic strip P to move toward the left.

In order to sever the continuously formed and coated element P into desired lengths, conventional cutter means 38 is employed and operates in conventional manner. The completed element P may be used structure S1 as shown in FIG. 2.

The invention is not limited for use in conjunction with structural elements having the cross sectional shape as that represented in FIGS. 2, 3, 4, and 5. If desired a film such as is schematically designated at F3 in FIG. 9 may be applied to the elongated element designated E in FIG. 9 to form a structure such as that shown in conjunction with the structure S2 as shown in FIG. 8. In order to apply the film F3 to the strip E, procedure such as is described above in conjunction with FIG. 1 is employed. Thus it is simply necessary in order to form the element E with the metallic coating F3 to eliminate the pressure rolls 11 and to supply the element E directly from the heater 10 to rolls 30 and thence to the movable transport device 31 as is obvious and as is shown in FIG. 7.

Figure 10:
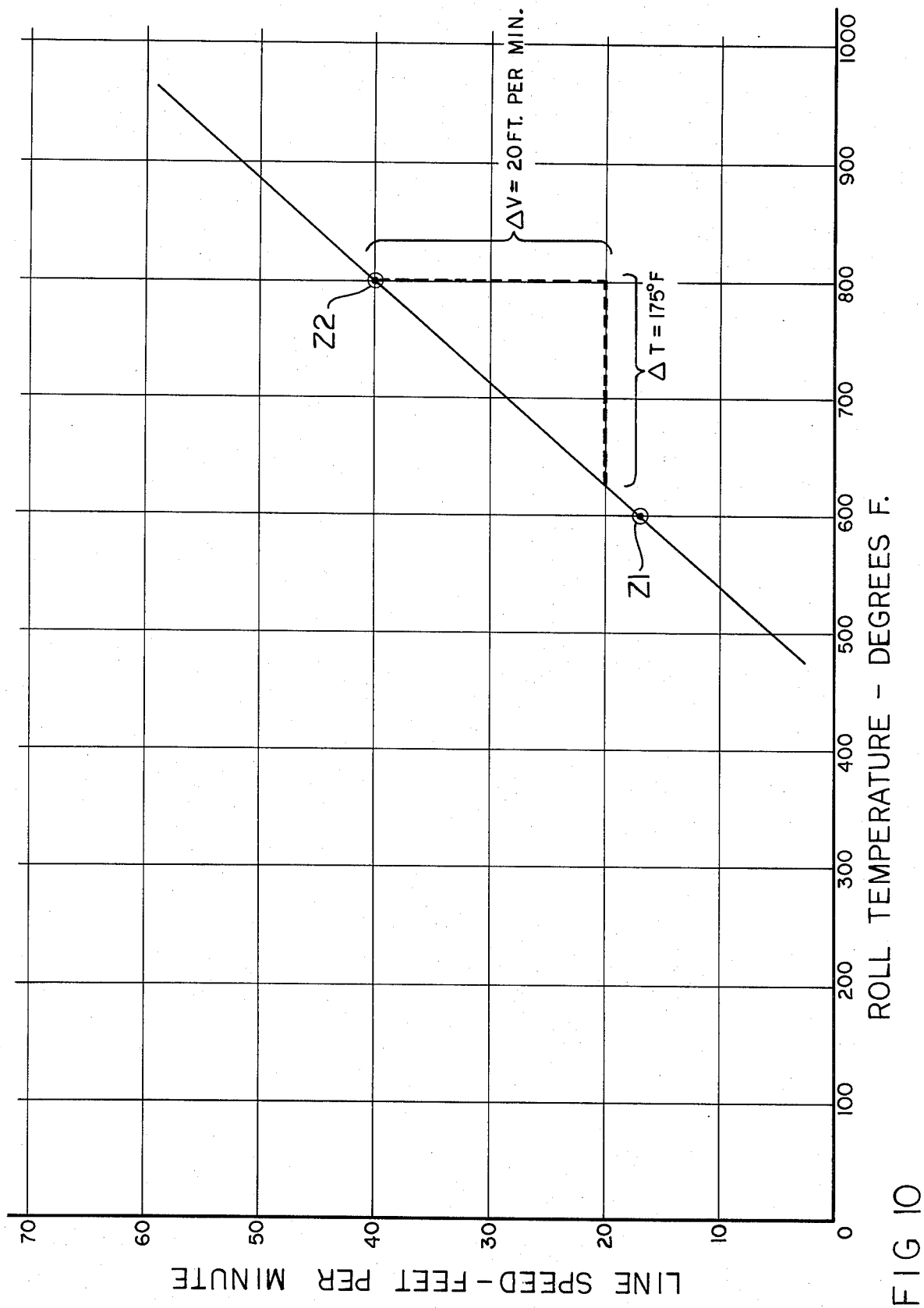
FIG. 10 is a curve showing linear speed of the elongated element through the apparatus plotted against roll temperature in order to demonstrate a fundamental relationship between speed and temperature according to one aspect of the invention.

Structure such as is shown at E in FIG. 9 may be operated feasibly at higher speeds and temperatures than are required to form and process the structure P. For example an optimum temperature for use in conjunction with the elongated element E has been found to be 800° F. and the linear velocity of the element E through the pressure rolls and out to finished condition has been found to be 40 feet per minute. A point in FIG. 10 representing this condition is shown at Z2. A minimum feasible temperature for element E has been found to be 750° F. at a velocity of 38 feet per minute and a maximum feasible temperature has been found to be 800° F. at a maximum velocity of 42 feet per minute.

Plotting a curve between points Z1 and Z2 in FIG. 10 and an appropriate choice of horizontal and vertical components indicates that for a change in temperature of 175° F., a change in velocity of 20 feet per minute is practical. Simple computation shows that for each change in velocity of one foot per minute a correlated change in roll temperature of approximately 8.75° F. is appropriate.

By the invention it is possible to form economically by extrusion means an elongated element such as that designated at P and E and in a continuous process to apply a decorative film to one or more surfaces of the elongated element. Thus by the invention substantial economies in production are effected and at the same time a product is provided which is characterized by a pleasing appearance and which eliminates sharp and jagged surfaces which pose a hazard particularly to small children.

The embodiments of the invention in which an exclusive property or privilege is claimed are defined as follows:

1. A method of transferring a decorative film forming a part of a coating on one surface of each of two tapes to two angularly related surfaces respectively of an elongated element, said method comprising the steps of passing said element and one of said tapes between a first pair of heated pressure rolls one of said rolls having a groove on the periphery thereof and with the coating on said one tape pressed into face contacting relation with one of said surfaces of said element by an ungrooved peripheral portion of said one roll and with the other of said surfaces disposed in said groove, adjusting the temperature of said first pair of rolls at a level between 550° F. and 650° F. and the velocity of movement of said element at a level between fourteen and nineteen feet per minute, the higher the temperature, the faster the velocity may be, twisting said element about its linear axis downstream from said first pair of pressure rolls, passing said element and the other of said tapes between a second pair of heated pressure rolls one of said rolls having a groove on the periphery thereof and with the coating on said other tape pressed into face contacting relation with the other of said surfaces of said element by an ungrooved peripheral portion of said one of said second pair of pressure rolls and with said one tape and said one surface disposed in said groove of said one of said second pair of pressure rolls, and adjusting the temperature of said second pair of pressure rolls to a level correlated with the velocity of movement of said element, said pairs of pressure rolls being similarly oriented.

2. A method according to claim 1 wherein the angle through which said element is twisted corresponds to an angle between said two angularly related surfaces of said elongated element.

3. A method of transferring a decorative film forming a part of a coating on one surface of each of two tapes to two angularly related surfaces respectively of an elongated element, said method comprising the steps of passing said element and one of said tapes between a first pair of heated pressure rolls one of said rolls having a groove on the periphery thereof and with the coating on said one tape pressed into face contacting relation with one of said surfaces of said element by an ungrooved peripheral portion of said one roll and with the other of said surfaces disposed in said groove, adjusting the temperature of said first pair of rolls at a level between 550° F. and 650° F., twisting said element about its linear axis downstream from said first pair of pressure rolls, passing said element and the other of said tapes between a second pair of heated pressure rolls, one of said rolls having a groove on the periphery thereof and with the coating on said other tape pressed into face contacting relation with the other of said surfaces of said element by an ungrooved peripheral portion of said one of said second pair of pressure rolls and with said one tape and said one surface disposed in said groove of said one of said second pair of pressure rolls, and adjusting the temperature of said second pair of pressure rolls to a level correlated with the velocity of movement of said element, said pairs of pressure rolls being similarly oriented.

4. A method of transferring a decorative film forming a part of a coating on one surface of each of two tapes to two angularly related surfaces respectively of an elongated element, said method comprising the steps of continuously supplying polystyrene pellets to a continuously operating extrusion device operating at a temperature within the range of 400° F. to 425° F., subjecting the extruded elongated element continuously to a bath of cooling liquid to stabilize its shape and form, drying said element, heating said element, passing said element and one of said tapes between a first pair of heated pressure rolls one of said rolls having a groove on the periphery thereof and with the coating on said one tape pressed into face contacting relation with one of said surfaces of said element by an ungrooved peripheral portion of said one roll and with the other of said surfaces disposed in said groove, twisting said element about its linear axis downstream from said first pair of pressure rolls, passing said element and the other of said tapes between a second pair of heated pressure rolls one of said rolls having a groove on the periphery thereof and with the coating on said other tape pressed into face contacting relation with the other of said surfaces of said element by an ungrooved peripheral portion of said one of said second pair of pressure rolls and with said one tape and said one surface disposed in said groove of said one of said second pair of pressure rolls, and adjusting the temperature of said second pair of pressure rolls to a level correlated with the velocity of movement of said element, said pairs of pressure rolls being similarly oriented.

* * * * *